Sept. 4, 1945. E. FARSON 2,384,020
ADJUSTABLE LEG
Filed June 23, 1944
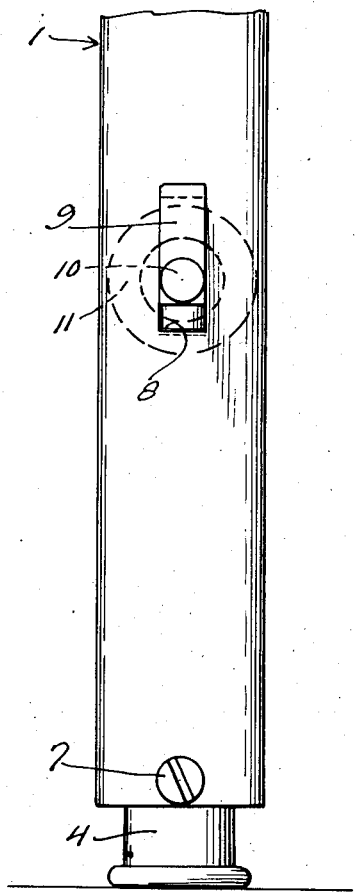
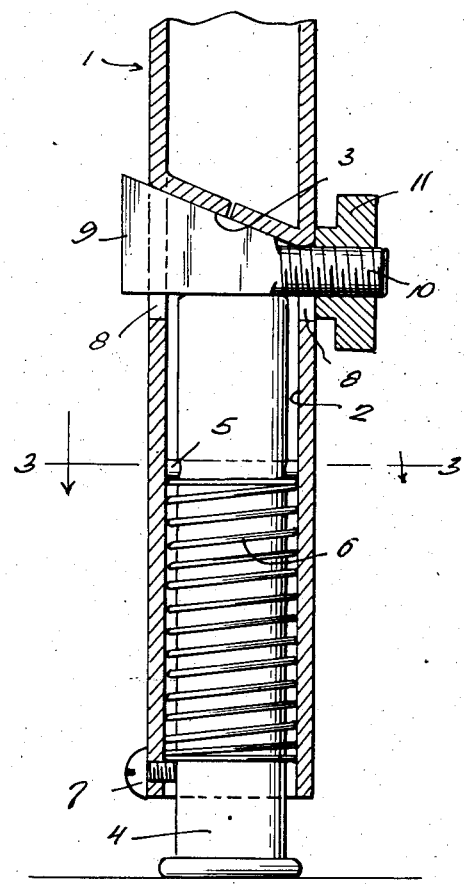
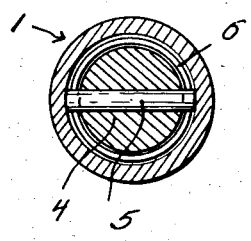
Inventor
Ernest Farson, Patented Sept. 4, 1945

2,384,020

UNITED STATES PATENT OFFICE 2,384,020

ADJUSTABLE LEG

Ernest Farson, Xenia, Ohio

Application June 23, 1944, Serial No. 541,794

4 Claims. (Cl. 248—189)

The present invention relates to new and useful improvements in supporting legs for various kinds of furniture, machinery, et cetera, and has for its primary object to provide, in a manner as hereinafter set forth, a leg of this character which may be expeditiously lengthened or shortened to compensate for irregularities in the surface on which the furniture or machinery is resting, thereby preventing wobbling.

Another very important object of the invention is to provide a supporting leg of the aforementioned character which embodies unique means for positively securing the device in adjusted position.

Other objects of the invention are to provide a supporting leg of the character described which will be comparatively simple in construction, strong, durable, reliable in use, compact and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is an elevational view of an adjustable supporting leg constructed in accordance with the present invention.

Figure 2 is a view in vertical section through the device.

Figure 3 is a view in horizontal section, taken substantially on the line 3—3 of Figure 2.

Referring now to the drawing in detail, it will be seen that the embodiment of the invention which has been illustrated comprises a leg 1 of suitable material having formed in its lower portion a vertical socket or bore 2. The bore 2 comprises a closed, inclined upper end 3.

Mounted for vertical sliding adjustment in the bore 2 and depending from the lower end of the leg 1 is a foot 4. The foot 4 is in the form of a solid rod of circular cross section having mounted diametrically therein at an intermediate point a pin 5 comprising projecting end portions. A coil spring 6 encircles the foot 4 in the bore 2 and has its upper end engaged beneath the end portions of the pin 5. The lower end of the coil spring 6 rests on a screw 7 which is threadedly mounted in the lower portion of the leg 1 and which projects into the bore 2. Thus, the spring 6 yieldingly urges the foot 4 upwardly in the bore 2.

Extending downwardly from the inclined upper end 3 of the bore 2 in diametrically opposite sides of the leg 1 and communicating with said bore are slots 8. A wedge 9 is operable in the slots 8 between the upper end of the foot 4 and the inclined upper end 3 of the bore 2. Projecting from the small end of the wedge 9 is a shank 10 having threaded thereon a thumb nut 11.

It is thought that the operation of the device will be readily apparent from a consideration of the foregoing. Briefly, to lengthen the leg 1, the nut 11 is screwed on the shank 10, said nut bearing against said leg 1. In this manner the wedge 9 is drawn inwardly on the coacting inclined end 3 of the bore 2 for adjusting the foot 4 downwardly against the tension of the coil spring 6. To shorten the leg, the thumb nut 11 is unscrewed on the shank 10 and the wedge 9 is moved outwardly. It will accordingly be seen that as the wedge 9 is adjusted outwardly, the coil spring 6 is permitted to move the foot 4 upwardly in the bore 2.

It is believed that the many advantages of an adjustable leg constructed in accordance with the present invention will be readily understood, and although a preferred embodiment of the device is as illustrated and described, it is to be understood that changes in the details of construction may be resorted to which will fall within the scope of the invention as claimed.

What is claimed is:

1. A leg of the class described having a vertical bore in its lower end portion, the bore terminating in an upper end wall which is inclined transversely of the bore, said leg further having transversely aligned slots at opposite sides thereof and communicating with the bore immediately below the inclined upper end wall thereof, a foot having a shank portion mounted for longitudinal sliding adjustment in the bore and depending from the lower end of the leg, a wedge operable in the slots and across the leg bore between the upper end of the foot shank and the inclined upper end wall of the bore, and means cooperable with the wedge to move and hold the same crosswise of the leg bore for adjusting said foot with respect to the end of the leg.

2. A leg of the class described having a vertical bore in its lower end portion and further having aligned slots therein communicating with the bore, the upper end of the bore having an inclined inner end formation adjacent the slots in the leg, a foot having a shank portion mounted for vertical sliding adjustment longitudinally in the bore, and a transverse wedge operable in the slots crosswise of the leg and engaged with the inner end formation of the leg bore and the upper end of the foot shank portion for adjusting said foot.

3. A leg of the class described having a vertical bore in its lower end portion and further having diametrically opposite slots therein communicating with the bore, the upper end portion of the bore having an inclined inner end formation, a foot mounted for vertical sliding adjustment in the bore and projecting beyond the end of the leg, a wedge operable in the slots transversely of the leg bore and engaged with the inner end formation of the leg bore and the upper end of the foot for adjusting said foot in the bore, a shank projecting from the small end of the wedge, an adjusting nut threadedly mounted on said shank and engaged with the leg, a pin mounted in the foot at an intermediate point and comprising projecting end portions, a screw threadedly mounted in the lower portion of the leg and projecting into the bore, and a coil spring encircling the foot and resting with its lower end on the screw with its upper end engaged beneath the pin for yieldingly urging the foot upwardly against the wedge.

4. A leg of the class described having a vertical bore in its lower end portion, the upper end of the bore having a transversely inclined formation, said leg further having diametrically opposite slots therein extending downwardly from the uppermost and lowermost portions of the inclined upper end formation of the bore and communicating with said bore, a foot mounted for vertical sliding adjustment in the bore and projecting beyond the end of the leg, a wedge operable in the slots and engaged between the inclined upper end formation of the bore and the upper end of said foot, said wedge being cooperable with said inclined upper end formation of the bore for vertically adjusting the foot, a shank projecting from the small end of the wedge, an adjusting nut threadedly mounted on said shank, a pin mounted diametrically in the foot at an intermediate point and including projecting end portions, a screw threadedly mounted in the lower end portion of the leg and projecting into the bore, and a coil spring encircling the foot and having its lower end resting on the screw, the upper end of said spring being engaged beneath the projecting end portions of the pin for yieldingly urging the foot upwardly beneath the wedge.

ERNEST FARSON.